United States Patent
Makarewicz et al.

(10) Patent No.: US 10,346,715 B2
(45) Date of Patent: Jul. 9, 2019

(54) CAMERA MISALIGNMENT DETERMINATION METHODS AND SYSTEMS

(71) Applicant: GM GLOBAL TECHNOLOGY OPERATIONS LLC, Detroit, MI (US)

(72) Inventors: Nathan P. Makarewicz, Oxford, MI (US); Joseph Machak, Oakland Township, MI (US); Mohannad Murad, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 218 days.

(21) Appl. No.: 15/482,628

(22) Filed: Apr. 7, 2017

(65) Prior Publication Data

US 2018/0293458 A1 Oct. 11, 2018

(51) Int. Cl.
| | |
|---|---|
| *G06K 9/00* | (2006.01) |
| *G06K 9/62* | (2006.01) |
| *G06T 7/11* | (2017.01) |
| *B60R 1/00* | (2006.01) |
| *B60R 1/02* | (2006.01) |
| *B60R 1/12* | (2006.01) |

(Continued)

(52) U.S. Cl.
CPC ............. *G06K 9/6202* (2013.01); *B60R 1/00* (2013.01); *B60R 1/02* (2013.01); *B60R 1/12* (2013.01); *G06T 7/11* (2017.01); *G06T 7/80* (2017.01); *H04N 7/183* (2013.01); *B60R 2001/1215* (2013.01); *B60R 2300/301* (2013.01); *B60R 2300/402* (2013.01); *B60R 2300/8046* (2013.01); *G06T 2207/10004* (2013.01); *G06T 2207/10024* (2013.01); *G06T 2207/30252* (2013.01)

(58) Field of Classification Search
CPC ........... G06K 9/00791; G06K 9/00805; G06K 9/209; G06K 9/32; G06K 9/46; G06K 9/00624; G06K 9/4604; H04N 5/23296; H04N 13/246; G06T 2207/30252; G06T 2207/30244; G06T 7/80; G06T 7/246; G06T 7/73; G06T 7/85
See application file for complete search history.

(56) References Cited

U.S. PATENT DOCUMENTS 8,280,158 B2 * 10/2012 Adcock .............. G06K 9/00751
348/14.15
8,861,781 B2 * 10/2014 Kuraki .................. G06T 1/0085
382/100

(Continued)

OTHER PUBLICATIONS

Dynamic Scene analysis—Processes, Ramesh Jain, IEEE, 0018-9162, 1981, pp. 12-18 (Year: 1981).*

*Primary Examiner* — Jayesh A Patel
(74) *Attorney, Agent, or Firm* — Lorenz & Kopf LLP

(57) ABSTRACT

Methods and systems are provided for assessing possible misalignment of cameras installed on vehicles. In accordance with one example, a camera is mounted on a body of the vehicle, and is configured to generate camera images. Each of the camera images includes a plurality of pixels. A processor is configured to at least facilitate analyzing the pixels of the camera images with respect to color, brightness, or both; and determining whether the camera is misaligned in its mounting on the vehicle based on the analyzing of the color, the brightness, or both, of the pixels.

19 Claims, 3 Drawing Sheets

(51) Int. Cl.
H04N 7/18 (2006.01)
G06T 7/80 (2017.01)

(56) References Cited

U.S. PATENT DOCUMENTS

| | | | |
|---|---|---|---|
| 8,929,632 B2* | 1/2015 | Horz | A61B 6/481 |
| | | | 382/130 |
| 2004/0052413 A1* | 3/2004 | Kunii | G06K 9/00791 |
| | | | 382/159 |
| 2011/0058708 A1* | 3/2011 | Ikenoue | G06T 7/251 |
| | | | 382/103 |
| 2011/0081075 A1* | 4/2011 | Adcock | G06K 9/00751 |
| | | | 382/165 |
| 2016/0229413 A1* | 8/2016 | Morley | B60K 28/063 |

* cited by examiner

CAMERA MISALIGNMENT DETERMINATION METHODS AND SYSTEMS

TECHNICAL FIELD

The technical field generally relates to the field of vehicles and, more specifically, to methods and systems for determining vehicle camera misalignment.

BACKGROUND

Many vehicles include a camera that provides a view for a region outside or inside (or both) the vehicle (e.g. a rear view camera that records images for a region behind the vehicle). However, in certain circumstances the rear view camera could become misaligned, for example after the vehicle contacts another vehicle or other object, or is installed to the vehicle in an incorrect orientation.

Accordingly, it is desirable to provide improved methods and systems for determining misalignment of cameras of vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes the steps of obtaining camera images for a camera that is mounted on a vehicle, each of the camera images including a plurality of pixels; analyzing, via a processor, the pixels of the camera images with respect to color, brightness, or both; and determining, via the processor, whether the camera is misaligned in its mounting on the vehicle based on the analyzing of the color, the brightness, or both, of the pixels.

In accordance with another exemplary embodiment, a system is provided. The system includes a communication link and a processor. The communication link is configured to provide camera images for a camera that is mounted on a vehicle. Each of the camera images includes a plurality of pixels. The processor is configured to at least facilitate analyzing the pixels of the camera images with respect to color, brightness, or both; and determine whether the camera is misaligned in its mounting on the vehicle based on the analyzing of the color, the brightness, or both, of the pixels.

In accordance with a further exemplary embodiment, a vehicle is provided. The vehicle includes a body, a camera, and a processor. The camera is mounted on the body, and is configured to generate camera images. Each of the camera images includes a plurality of pixels. The processor is configured to at least facilitate analyzing the pixels of the camera images with respect to color, brightness, or both; and determining whether the camera is misaligned in its mounting on the vehicle based on the analyzing of the color, the brightness, or both, of the pixels.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
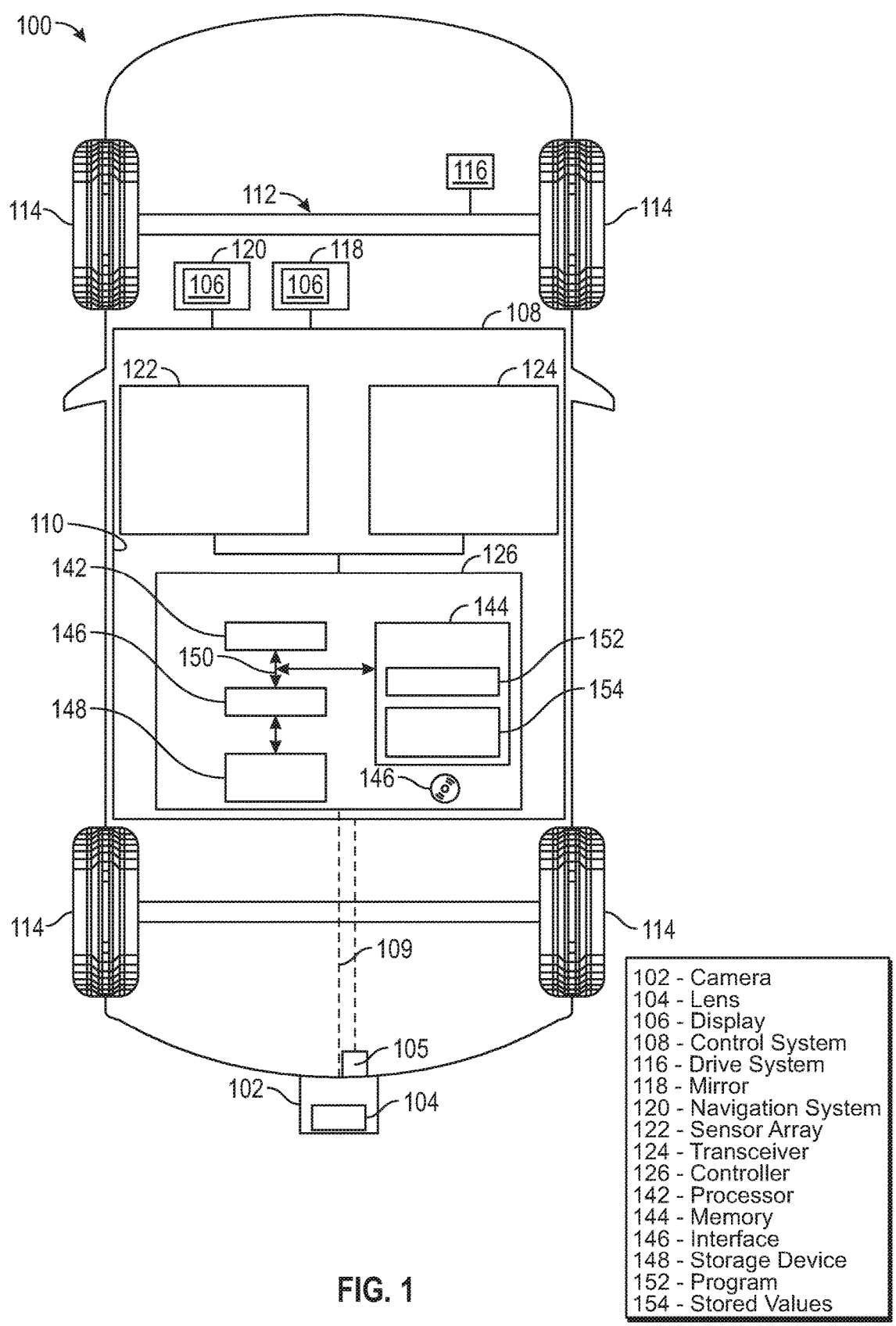
FIG. 1 is a functional block diagram of a vehicle that includes a camera, a control system for controlling the camera, and one or more displays for displaying images from the camera, in accordance with an exemplary embodiment.

FIG. 1 illustrates a vehicle 100, according to an exemplary embodiment. As described in greater detail further below, the vehicle 100 includes a camera 102 that is mounted on a body 110 of the vehicle 100 and provides images. The camera 102 is controlled via a control system 108, as depicted in FIG. 1. In various embodiments, the control system 108 assesses an alignment of the camera 102 based on the provided images, and takes action in appropriate circumstances based on the alignment of the camera 102, for example as discussed further below in connection with FIG. 1 as well as FIGS. 2 and 3.

The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system having a camera image with a fixed referenced point.

The vehicle 100 includes the above-referenced body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the camera 102 is mounted on the body 110 of the vehicle 100. In the depicted embodiment, the camera 102 is mounted on a rear end of the vehicle, as shown in FIG. 1. It will be appreciated that this may vary in certain embodiments. For example, while in the depicted embodiment, the camera 102 is a rear-facing camera disposed on or proximate a rear portion of the vehicle 100, in other embodiments, the camera 102 may be mounted on a passenger's side, driver's side, or elsewhere on the body 110 of the vehicle 100 (e.g. on top of the vehicle 100, in front of the vehicle 100, on a windshield or grille of the vehicle 100, on a steering wheel shroud facing the driver seat, and so on).

The camera 102 provides images for viewing on one or more displays 106 that are disposed inside the vehicle 100 (i.e. inside the body 110 of the vehicle 100), and/or for providing other information for the vehicle 100 (e.g. information to a vehicle control system for use in vehicle control). As depicted in FIG. 1 and noted above, the camera 102 includes a lens 104 that captures images for the camera 102.

In one embodiment, the camera 102 provides images for viewing on a display 106 of a rear view mirror 118 of the vehicle 100. Also as depicted in FIG. 1, in one embodiment the camera 102 provides images for viewing on a display 106 of a navigation system 120 of the vehicle 100. In various embodiments, the display 106 may be provided on both the rear view mirror 118 and the navigation system 120, and/or on one or more other non-depicted displays 106 within the vehicle 100 (e.g., in a front instrument panel of the vehicle 100, in one or more side mirrors of the vehicle 100, or the like). In certain embodiments, each display 106 comprises a video screen that is coupled to the camera 102. In one exemplary embodiment the display 106 comprises a liquid crystal display (LCD) screen or a light emitting diode (LED) screen. However, this may vary in other embodiments. In certain embodiments, in addition to using the disclosed techniques for viewing on a display, the disclosed techniques and associated algorithms may also be used on cameras that are used for image processing as with object detection, event avoidance, and autonomous driving applications. Also in one embodiment, a nozzle 105 is disposed on or near the camera 102. The nozzle 105 is coupled to a non-depicted water source (e.g. to a reservoir, via a pump) as well as to the control system 108, and washes the lens 104 when appropriate via instructions provided by the control system 108 (e.g. by the processor 142 thereof, described further below).

The control system 108 controls operation of the camera 102 and the displays 106. The control system 108 is disposed within the body 110 of the vehicle 100. In one embodiment, the control system 108 is mounted on the chassis 112. Among other control features, the control system 108 obtains images from the camera 102, processes the images, analyzes pixel information for the images, assesses an alignment of the camera 102, and takes actions as appropriate based on the alignment of the camera 102. In various embodiments, the control system 108 provides these and other functions in accordance with steps of the process 200 described further below in connection with FIGS. 2 and 3. In certain embodiments, the control system 108 may be disposed outside the body 110, for example on a remote serve, in the cloud, or in a remote smart phone or other device where image processing is performed remotely. In addition, in certain embodiments, the control system 108 may be disposed within the camera 102 itself (e.g. a processing capability may be built into a component of the camera 102).

Also as depicted in FIG. 1, in various embodiments the control system 108 is coupled to the camera 102 via a communication link 109, and receives camera images from the camera 102 via the communication link 109. In certain embodiments, the communication link 109 comprises one or more wired connections, such as one or more cables (e.g. coaxial cables and/or one or more other types of cables). In other embodiments, the communication link 109 may comprise one or more wireless connections.

As depicted in FIG. 1, the control system 108 includes a controller 126. Also as depicted in FIG. 1, in certain embodiments the control system 108 also includes a sensor array 122 and/or a transceiver 124. In certain embodiments, one or more sensors of the sensor array 122 are used to provide information to the controller 126 for processing images from the camera 102. For example, in certain embodiments, certain sensor(s) may provide vehicle speed (e.g. to determine whether or not the vehicle 100 is moving, and the trajectory and direction of movement), along with for example using one or more wheel speed sensors or accelerometers. Also in certain embodiments, various radar, lidar, ultrasound, and/or other sensors may be used for object detection. Also in certain embodiments, the images from the camera 102 may be received by the control system 108 via one or more transceivers 124 and/or components thereof (e.g. a receiver).

The controller 126 processes and analyzes the images provided from the camera via the communication link 109 (and, in some embodiments, images and/or information provided via the sensor array 122 and/or transceiver 124), assesses whether the camera 102 is mounted properly on the vehicle 100, and takes action in appropriate circumstances in which the camera 102 is not mounted correctly. Also in various embodiments, the controller 126 controls the display of images associated with the camera 102 on the one or more displays 106 of the vehicle 100. In various embodiments, the controller 126 provides these and other functions in accordance with the steps discussed further below in connection with the schematic drawings of the vehicle 100 in FIG. 1 and the flowchart of FIG. 2 and associated illustration of a display image of FIG. 3 in connection with the process 200 of FIG. 2).

In one embodiment, the controller 126 is coupled to the camera 102, the displays 106, the sensor array 122, and the transceiver 124. Also in one embodiment, the controller 126 is disposed within the control system 108, within the vehicle 100. In certain embodiments, the controller 126 (and/or components thereof, such as the processor 142 and/or other components) may be part of the camera 102, disposed within the camera 102, and/or disposed proximate the camera 102. Also in certain embodiments, the controller 126 may be disposed in one or more other locations of the vehicle 100. In addition, in certain embodiments, multiple controllers 126 may be utilized (e.g. one controller 126 within the vehicle 100 and another controller within the camera 102), among other possible variations. In addition, in certain embodiments, the controller can be placed outside vehicle, such as in a remote server, in the cloud or on a remote smart device.

As depicted in FIG. 1, the controller 126 comprises a computer system. In certain embodiments, the controller 126 may also include one or more of the sensors of the sensor array 122, the transceiver 124 and/or components thereof, the camera 102 and/or components thereof, one or more displays 106 and/or components thereof, and/or one or more other devices and/or systems and/or components thereof. In addition, it will be appreciated that the controller 126 may otherwise differ from the embodiment depicted in FIG. 1.

For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the process 200 described further below in connection with FIGS. 2 and 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. In one embodiment, the interface 146 obtains the various data from the sensors of the sensor array 122 and/or the transceiver 124. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 200 (and any sub-processes thereof) described further below in connection with FIGS. 2 and 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

Figure 2:
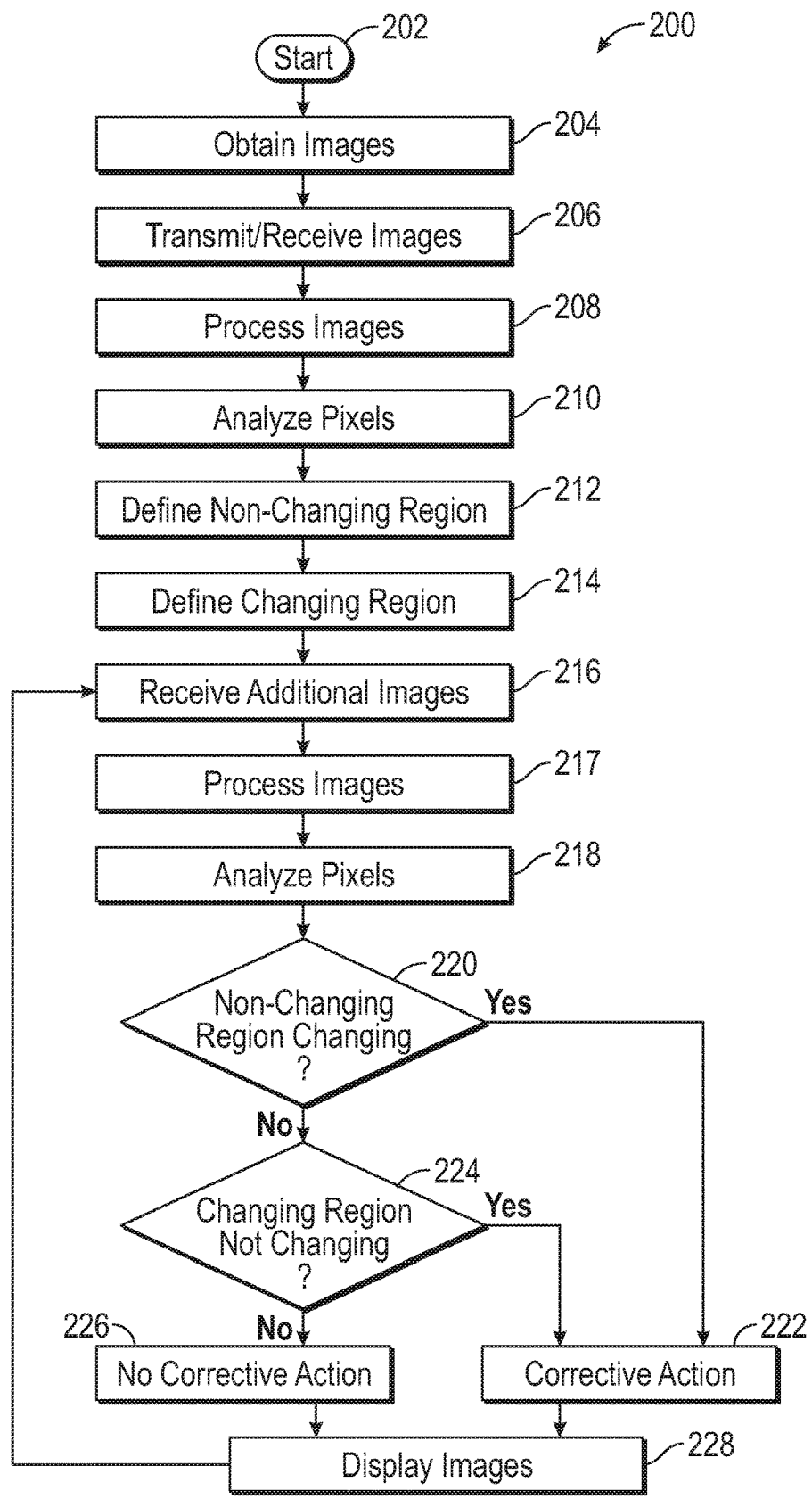
FIG. 2 is a flowchart of a process for assessing camera alignment for a camera of a vehicle, and that can be implemented in connection with the vehicle, camera, control system, and display of FIG. 1, in accordance with an exemplary embodiment.

FIG. 2 is a flowchart of a process 200 for assessing camera alignment for a camera of a vehicle, in accordance with an exemplary embodiment. The process 200 of FIG. 2 can be implemented in connection with the vehicle 100, camera 102, control system 108, and displays 106 of FIG. 1, in accordance with an exemplary embodiment. The process 200 is also discussed below in connection with FIG. 3, with depicts an exemplary display image 300 of one of the displays 106 of the vehicle 100.

As depicted in FIG. 2, the process begins at 202. In one embodiment, the process 200 begins when a vehicle drive or ignition cycle begins, for example when a driver approaches or enters the vehicle, or when the driver turns on the vehicle and/or an ignition therefor (e.g. by turning a key, engaging a keyfob or start button, and so on). In another embodiment, the process 200 begins when the camera 102 is activated (e.g., when the vehicle 100 is in a reverse gear triggering use of a rear camera, and so on). In one embodiment, the steps of the process 200 are performed continuously during operation of the vehicle.

Camera images are obtained (step 204). Specifically, camera images are obtained for the camera 102 of FIG. 1. The images are transmitted and received (step 206). In one embodiment, the images are transmitted by the camera 102 of FIG. 1 along the communication link 109 of FIG. 1 to the control system 108 (e.g. the controller 126, including the processor 142) of FIG. 1. In certain other embodiments, the images are provided to the control system 108 via one or more transceivers, such as the transceiver 124 of FIG. 1.

The images are processed (step 208). In various embodiments, the camera images of steps 204 and 206 are processed during step 208 in order to crop, adjust, and/or re-size the images for display in accordance with the dimensions of one or more of the displays of FIG. 1. In various embodiments, the processing of the camera images is performed via the processor 142 of FIG. 1.

Analysis is performed with respect to pixels of the camera images (step 210). Specifically, in various embodiments, the pixels of each frame of the camera images are analyzed in sequence with respect to color and brightness by the processor with respect to whether corresponding images between the different picture frames include changes in the corresponding pixels (e.g. as to color and/or brightness).

Also in various embodiments, the analysis of the pixels is performed by the processor 142 of FIG. 1. In certain embodiments, the analysis is performed with respect to the processed/filtered images of step 208. In certain other embodiments, the analysis is performed with respect to raw images of steps 204 and/or 206, i.e. prior to processing and/or filtering of step 208.

A non-changing region is identified for the images (step 212). Specifically, in certain embodiments, the non-changing region is identified as a region of the image (either the raw image of steps 204 and 206 or the processed image of step 208) for which the pixels have been determined to not be changing (or for which any pixel rate of change is determined to be less than a predetermined threshold). In various examples of the present Application, a "change" in a pixel refers to a change in color or brightness of the pixel, and a "rate of change" in a pixel refers to a rate of change in the pixel's color or brightness. In one embodiment, the non-changing region is identified based on the analysis of pixels of step 210 among sequential frames of the camera images. Also in certain embodiments, the predetermined thresholds may be different for the rate of change in color versus the rate of change in brightness. In certain embodiments, the non-changing region may be identified based on prior knowledge of the vehicle 100, for example with respect to a region of the image known to be associated with a bumper, pillar, and/or other fixture of the vehicle 100). Also in certain embodiments, other data may also be used in making this determination, such as, by way of example, confirmation that the doors are closed and the trunk or hatch is closed. For example, in one embodiment, if the camera is mounted on the rear trunk, then data from sensors on or proximate the rear trunk may be utilized to confirm whether the doors are closed and the trunk is closed (e.g. if the trunk is open, the images would not be analyzed because the reference point would not be there, in one exemplary embodiment), and so on. By way of additional example, if a trailer is connected to a bicycle or motorcycle, then the detection of the bicycle or motorcycle may be utilized as part of the algorithm for detecting the presence or absence of a fixed reference point, and so on.

In addition, a changing region is identified for the images (step 214). Specifically, in certain embodiments, the changing region is identified as a region of the image (either the raw image of steps 204 and 206 or the filtered/processed image of step 208) for which the pixels have been determined to be changing (or for which any pixel rate of change is determined to be greater than a predetermined threshold). Also, similar to the discussion above with respect to step 212, in various examples of the present Application, a "change" in a pixel refers to a change in color or brightness of the pixel, and a "rate of change" in a pixel refers to a rate of change in the pixel's color or brightness. Also similar to the discussion above, in certain embodiments, the predetermined thresholds may be different for the rate of change in color versus the rate of change in brightness. In one embodiment, the changing region is identified based on the analysis of pixels of step 210 among sequential frames of the camera images. In certain embodiments, the changing region may be identified based on prior knowledge of the vehicle 100, for example with respect to a region of the image known to be associated with a portion of the image that is not obstructed by a bumper, pillar, and/or other fixture of the vehicle 100). Also in certain embodiments, other data may also be used in making this determination, such as, by way of example, confirmation that the doors are closed and the trunk or hatch is closed. For example, similar to the discussion above, in one embodiment, if the camera is mounted on the rear trunk, then data from sensors on or proximate the rear trunk may be utilized to confirm whether the doors are closed and the trunk is closed (e.g. if the trunk is open, the images would not be analyzed because the reference point would not be there, in one exemplary embodiment), and so on. By way of additional example, if a trailer is connected to a bicycle or motorcycle, then the detection of the bicycle or motorcycle may be utilized as part of the algorithm for detecting the presence or absence of a fixed reference point, and so on. In certain embodiments, the reference image to which the subsequent images are compared does not necessarily need to be an image captured by the camera 102 on the given vehicle 100. For example, in certain embodiments, the reference image may be one that is programmed into and resides in the control system 108 and that was generated from a different camera, or that was computer generated.

Figure 3:
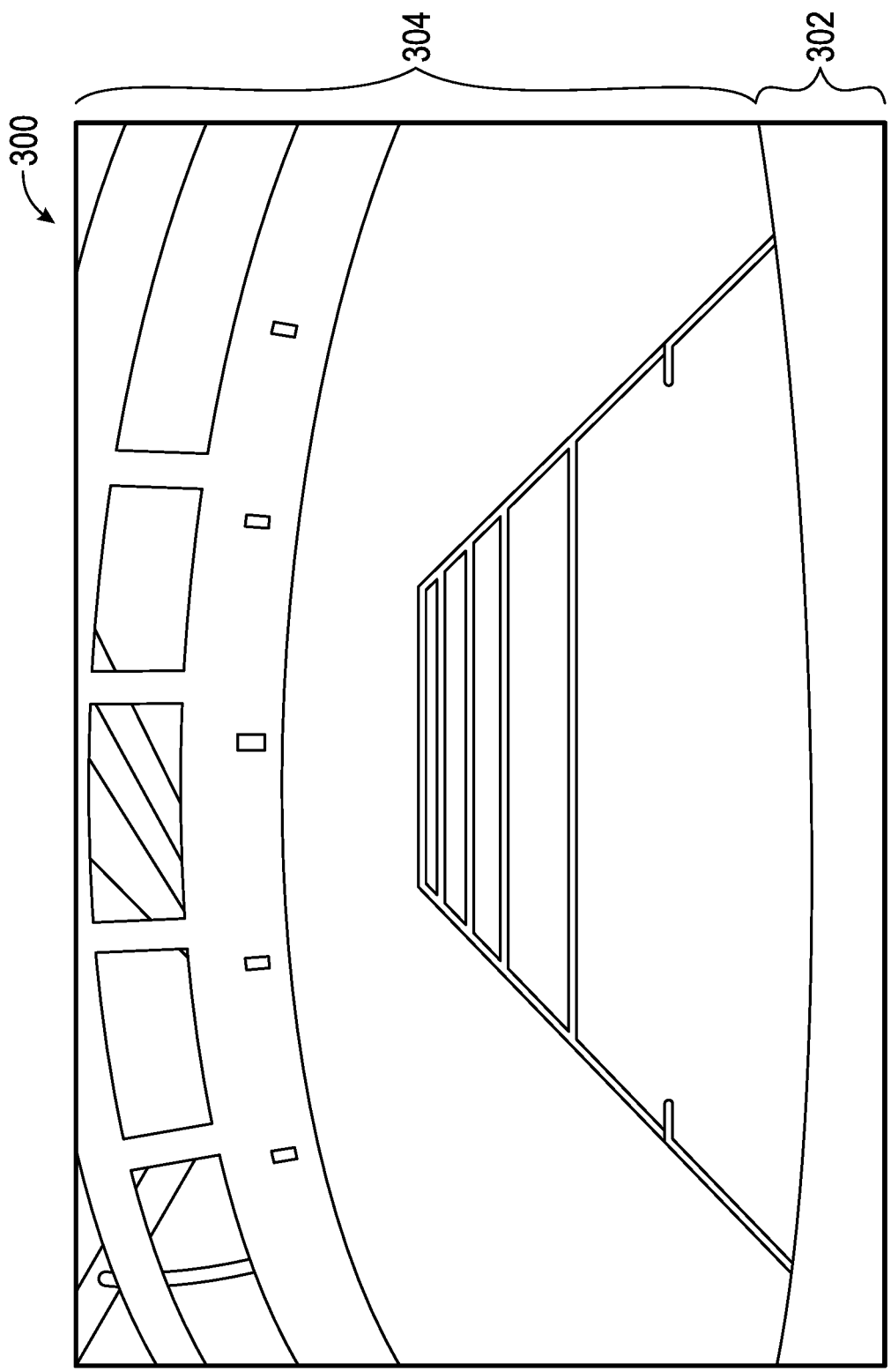
FIG. 3 provides a display image for a vehicle, and that can be implemented in connection with the vehicle, camera, and control system of FIG. 1 and the process of FIG. 2, in accordance with an exemplary embodiment.

With reference to FIG. 3, a display image 300 is depicted. In one embodiment, the display image 300 corresponds to a raw camera image corresponding to step 204 and 206. In another embodiment, the display image 300 corresponds to a processed/filtered camera image from step 208. As depicted in FIG. 3, the display image 300 of FIG. 3 includes both a non-changing region 302 (e.g., corresponding to step 212 of FIG. 2) and changing region 304 (e.g., corresponding to step 214 of FIG. 2). In the depicted example of FIG. 3, the non-changing region 302 corresponds to a rear bumper of the vehicle 100 that obstructs a portion of the display image 300, while the changing region 304 depicts a remainder of the display image 300 that is not obstructed by the bumper. However, this may vary in other embodiments.

With reference again to FIG. 2, additional camera images are received (step 216). In various embodiments, additional camera images from the camera 102 of FIG. 1 are received by the control system 108 of FIG. 1 (e.g. the processor 142 of FIG. 1), for example via the manners discussed above with respect to steps 204 and 206. In certain embodiments, the receiving of the pixels of step 216 occurs in the same vehicle drive and/or ignition cycle of steps 204 and 206. In other embodiments, the receiving of the pixels of step 216 occurs in different vehicle drives and/or ignition cycles of steps 204 and 206 (e.g. in subsequent cycles as compared with steps 204 and 206).

In one embodiment, the additional images of step 216 are then processed (step 217), similar to the processing described above in connection with step 208. In addition, also in one embodiment, the pixels of the additional images of step 216 are analyzed (step 218), similar to the analysis described above in connection with step 210.

A determination is made as to whether any pixels of the non-changing region are in fact changing (step 220). In one embodiment, step 220 includes a determination as to whether the defined non-changing region of step 212 (e.g. corresponding to region 302 of FIG. 3) includes pixels within this region are actually changing (e.g. experiencing a change in color and/or brightness) with respect to the additional images of step 216 (e.g. as determined via the analysis of step 218). In certain embodiments, the determination is made with respect to the raw images of step 216 as analyzed in step 218. In certain other embodiments, the determination is made with respect to the processed/filtered images of step 217 as analyzed in step 218.

Also in various embodiments, one or more predetermined thresholds are utilized for the determination of step 220. Accordingly, in one such embodiment, the pixels are determined to be changing if the determined rate of change of the pixels (e.g. the rate of change in color and/or brightness of the pixels) as determined via the analysis of step 218 is greater than one or more predetermined thresholds (e.g. a first predetermined threshold for rate of change of brightness and/or a second predetermined threshold for rate of change of color). This would help account, for example, for shadows on the non-changing region 302, which would not necessarily indicate a misalignment of the camera 102. For example, if the determined rate of change of brightness and/or color is greater than the respective threshold(s), then the pixels are determined to be changing. Otherwise, the pixels are determined to be not changing. Also in various embodiments, the determinations of step 220 are made by the processor 142 of FIG. 1.

If it is determined in step 220 that the pixels in the non-changing region are in fact changing (e.g., in color and/or brightness, and/or changing in color and/or brightness at a rate that is greater than the corresponding predetermined threshold(s)), then corrective action is taken (step 222). Specifically, a possible misalignment of the camera 102 of FIG. 1 is determined, and appropriate corrective notification and/or other action is taken. In various embodiments, the corrective action includes the setting of a flag, and the initiation of a diagnostic test code (DTC). In certain embodiments, the DTC code is provided for the driver, operator, and/or owner of the vehicle 100, to the vehicle manufacturer, and/or to one or more service representatives. Also in certain embodiments, a notification is provided for the driver and/or other occupants of the vehicle via one or more displays 106 of the vehicle 100 of FIG. 1.

In certain embodiments, the actions of step 222 may include withholding the display of the camera images so long as the camera 102 is deemed to be out of alignment, and/or adjusting the camera images in view of the possible misalignment. For example, in one embodiment, adjustments are made to the raw images (e.g. the unprocessed images of steps 206 and/or 208). For example, in one embodiment, if more of the bumper is seen in the image as compared with expectations (or as compared with prior images), then the cropping of step 208 is moved more upward to compensate for this effect.

Also, in one embodiment during step 222, when an image includes pixels that are not changing in a region that is supposed to be changing, then a lens of the camera is first washed to help make sure that no dirt is on the lens, for example to help make sure that a blockage of the lens is not causing an issue. In one such embodiment, if the lens is determined to be dirty, then the notification in step 222 includes a message that the camera may be dirty and/or misaligned. Also in one embodiment, if the lens is determined to be dirty and the lens is washed as part of step 222 (e.g. via the nozzle 105 of FIG. 1), via instructions provided by the processor 142 of FIG. 1), then the lens is determined to be misaligned if the possible misalignment measure (e.g. of step 222 and/or step 224) is still present after the washing of the lens (and thus further corrective action, such as a further notice and/or adjustment of the images may be performed). Otherwise, in one embodiment if the if the lens is determined to be dirty and the lens is washed as part of step 222, then the lens is determined to not be misaligned if the possible misalignment measure (e.g. of step 222 and/or step 224) is no longer present after the washing of the lens (and thus no further corrective action would be performed).

It will be appreciated that multiple of the notifications and/or other actions described above may be implemented, for example simultaneously and/or in sequence, as part of step 222. In addition, in various embodiments, the notifications and/or actions of step 222 are implemented via instructions provided by the processor 142 of FIG. 1.

Conversely, if it is determined in step 220 that the pixels in the non-changing region are not changing (e.g., are not changing in color and/or brightness, and/or are changing in color and/or brightness at a rate that is less than or equal to the corresponding predetermined threshold(s)), then a determination is made as to whether any pixels of the changing region are in fact not changing (step 224). In one embodiment, step 224 includes a determination as to whether the defined changing region of step 214 (e.g. corresponding to region 304 of FIG. 3) includes pixels that are not changing within this region with respect to the additional images of step 216 (e.g. as determined via the analysis of step 218). In certain embodiments, the determination is made with respect to the raw images of step 216 as analyzed in step 218. In certain other embodiments, the determination is made with respect to the processed/filtered images of step 217 as analyzed in step 218.

Also in various embodiments, one or more thresholds are utilized for the determination of step 224, similar to the discussion above with respect to step 220. Accordingly, in one such embodiment, the pixels are determined to be not changing if the determined rate of change of the pixels (e.g. the rate of change in color and/or brightness of the pixels) as determined via the analysis of step 218 is determined is less than or equal to one or more predetermined thresholds (e.g. a first predetermined threshold for rate of change of brightness and/or a second predetermined threshold for rate of change of color, such as the same predetermined thresholds as step 220, in one embodiment). Similar to the discussion above, for example, this would help account, for example, for shadows on the changing region 302. For example, if the determined rate of change is less than or equal to the threshold, then the pixels are determined to be not changing. Otherwise, the pixels are determined to be changing. Also in various embodiments, the determinations of step 224 are made by the processor 142 of FIG. 1.

If it is determined in step 224 that the pixels in the changing region are in fact not changing (e.g., that the pixels in this region are not changing in color or brightness, or are changing in color or brightness at a rate that is less than or equal to the corresponding predetermined threshold(s)), then the process proceeds to the above-described step 222. Specifically, as discussed above, during step 222, a possible misalignment of the camera 102 is determined, and appropriate corrective action is taken. Conversely, if it is determined in step 224 that the pixels in the changing region are changing (or, are changing at a rate that is greater than the applicable predetermined threshold(s)), then no camera misalignment is determined, and no corrective action is taken (step 226).

In addition, the camera images are displayed (step 228). In various embodiments, the camera images are displayed via one or more displays 106 of FIG. 1 based on instructions provided by the processor 142 of FIG. 1. In certain embodiments, the processes/filtered images of steps 208, 217 are displayed. In other embodiments, raw images of steps 204, are displayed. In various embodiments, the display of step 228 may include raw and/or processed images of steps 216-218 corresponding to the additional images, and in certain embodiments may also include raw and/or processed images of steps 204-210 corresponding to original camera images (e.g., particularly if such original images were displayed during the same vehicle drive or ignition cycle as the additional images). Also in one embodiment, the display image 300 of FIG. 3 comprises one exemplary display provided in step 228.

Also, as depicted in FIG. 2, in certain embodiments the images may be displayed in step 228 regardless of whether corrective action is taken in steps 222, or whether no corrective action is taken in step 224. In certain embodiments, the images displayed in step 228 may be affected by any corrective action (e.g. in certain embodiments, the images may be not displayed as part of the corrective action, and/or an adjustment to the images may be performed as part of the corrective action).

Also as depicted in FIG. 1, in one embodiment the process proceeds to step 216. Steps 216-228 are then performed, continuously in one embodiment, in a new iteration. In one embodiment, steps 216-228 repeat, preferably continuously, so long as the current vehicle drive or ignition cycle is in operation, and/or so long as the camera 102 is currently being used, among other possible variations in different embodiments.

Accordingly, the systems, vehicles, and methods described herein provide for assessment of possible misalignment of a camera of a vehicle. Specifically, in various embodiments, pixel analysis of camera images is utilized to track rate of change, or lack of rate of change, in specific pixel regions, for use in detecting whether a vehicle camera is out of alignment. Appropriate action is taken when the camera is deemed to be out of alignment.

It will be appreciated that the systems, vehicles, and methods may vary from those depicted in the Figures and described herein. For example, the vehicle 100, the camera 102, the displays 106, the control system 108, and/or various components thereof may vary from that depicted in FIGS. 1-3 and described in connection therewith, in various embodiments. It will similarly be appreciated that the steps of the process 200 may differ from those depicted in FIGS. 2 and 3, and/or that various steps of the process 200 may occur concurrently and/or in a different order than that depicted in FIGS. 2 and 3, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining a first plurality of camera images for a camera that is mounted on a vehicle, each of the first plurality of camera images including a plurality of pixels in a first set of sequential frames;
   analyzing, via a processor, the pixels of the first plurality of camera images of the first set of sequential frames with respect to color, brightness, or both;
   defining, via the processor, a non-changing region of the first plurality of camera images in which the pixels are not changing between the first set of sequential frames, wherein the pixels of the first plurality of camera images are determined to not be changing in the first set of sequential frames if a rate of change of brightness of respective pixels between the first set of sequential frames does not exceed a first predetermined threshold, a rate of change of color of respective pixels between the first set of sequential frames does not exceed a second predetermined threshold, or both;
   defining, via the processor, a changing region of the first plurality of camera images in which the pixels are changing between the first set of sequential frames, wherein the pixels of the first plurality of camera images are determined to be changing in the first set of sequential frames if the rate of change of brightness of respective pixels between the first set of sequential frames exceeds the first predetermined threshold, the rate of change of color of respective pixels between the first set of sequential frames exceeds the second predetermined threshold, or both;
   obtaining, subsequent to the first plurality of camera images, a second plurality of camera images for the camera, each of the second plurality of camera images including a second plurality of pixels in a second set of sequential frames that correspond with, and are subsequent to, the first set of sequential frames;
   analyzing, via the processor, the pixels of the second plurality of camera images of the second set of sequential frames with respect to color, brightness, or both;
   determining, via the processor, whether pixels of the second plurality of camera images corresponding to the non-changing region of the first plurality of camera images are in fact changing in the second set of sequential frames, wherein the pixels of the second plurality of camera images are determined be changing in the second set of sequential frames if the rate of change of brightness of respective pixels between the second set of sequential frames exceeds the first predetermined threshold, the rate of change of color of respective pixels between the second set of sequential frames exceeds the second predetermined threshold, or both;
   determining, via the processor, whether pixels of the second plurality of camera images corresponding to the changing region of the first plurality of camera images are in fact not changing in the second set of sequential frames, wherein the pixels of the second plurality of camera images are determined be not changing in the second set of sequential frames if the rate of change of brightness of respective pixels between the second set of sequential frames does not exceed the first predetermined threshold, the rate of change of color of respective pixels between the second set of sequential frames does not exceed the second predetermined threshold, or both; and
   determining, via the processor, whether the camera is misaligned in its mounting on the vehicle based on the analyzing of the color, the brightness, or both, of the pixels, including based on whether the pixels corresponding to the non-changing region of the first set of sequential frames are in fact changing in the second set of sequential frames, the pixels corresponding to the changing region of the first set of sequential frames are in fact not changing in the second set of sequential frames, or both.

2. The method of claim 1, wherein the determining of whether the camera is misaligned comprises:
   determining that the camera is misaligned if the pixels corresponding to the non-changing region are changing in the second set of sequential frames, the pixels corresponding to the changing region are not changing in the second set of sequential frames, or both.

3. The method of claim 2, further comprising:
determining that the camera is not misaligned if the pixels corresponding to the non-changing region are not changing in the second set of sequential frames, the pixels corresponding to the changing region are changing in the second set of sequential frames, or both.

4. The method of claim 1, wherein:
the non-changing region and the changing region are further defined via the processor using information pertaining to a fixed object on the vehicle that obstructs the non-changing region but does not obstruct the changing region of the camera images.

5. The method of claim 1, further comprising:
detecting whether a lens of the camera is dirty, via the processor, based on the analyzing of the color, the brightness, or both, of the pixels.

6. A system comprising:
a communication link configured to:
provide a first plurality of camera images for a camera that is mounted on a vehicle, each of the first plurality of camera images including a plurality of pixels in a first set of sequential frames; and
provide, subsequent to the first plurality of camera images, a second plurality of camera images for the camera, each of the second plurality of camera images including a second plurality of pixels in a second set of sequential frames that correspond with, and are subsequent to, the first set of sequential frames; and
a processor configured to at least facilitate:
analyzing the pixels of the first plurality of camera images of the first set of sequential frames with respect to color, brightness, or both;
defining a non-changing region of the first plurality of camera images in which the pixels are not changing between the first set of sequential frames, wherein the pixels are determined to not be changing if a rate of change of brightness of respective pixels between the first set of sequential frames does not exceed a first predetermined threshold, a rate of change of color of respective pixels between the first set of sequential frames does not exceed a second predetermined threshold, or both;
defining a changing region of the first plurality of camera images in which the pixels are changing between the first set of sequential frames, wherein the pixels are determined to be changing if the rate of change of brightness of respective pixels between the first set of sequential frames exceeds the first predetermined threshold, the rate of change of color of respective pixels between the first set of sequential frames exceeds the second predetermined threshold, or both;
analyzing the pixels of the second plurality of camera images of the second set of sequential frames with respect to color, brightness, or both;
determining whether pixels of the second plurality of camera images corresponding to the non-changing region of the first plurality of camera images are in fact changing in the second set of sequential frames, wherein the pixels of the second plurality of camera images are determined be changing in the second set of sequential frames if the rate of change of brightness of respective pixels between the second set of sequential frames exceeds the first predetermined threshold, the rate of change of color of respective pixels between the second set of sequential frames exceeds the second predetermined threshold, or both;
determining whether pixels of the second plurality of camera images corresponding to the changing region of the first plurality of camera images are in fact not changing in the second set of sequential frames, wherein the pixels of the second plurality of camera images are determined be not changing in the second set of sequential frames if the rate of change of brightness of respective pixels between the second set of sequential frames does not exceed the first predetermined threshold, the rate of change of color of respective pixels between the second set of sequential frames does not exceed the second predetermined threshold, or both; and
determining whether the camera is misaligned in its mounting on the vehicle based on the analyzing of the color, the brightness, or both, of the pixels, including based on whether the pixels corresponding to the non-changing region of the first set of sequential frames are in fact changing in the second set of sequential frames, the pixels corresponding to the changing region of the first set of sequential frames are in fact not changing in the second set of sequential frames, or both.

7. The system of claim 6, wherein the processor is configured to at least facilitate:
determining that the camera is misaligned if the pixels corresponding to the non-changing region are changing in the second set of sequential frames, the pixels corresponding to the changing region are not changing in the second set of sequential frames, or both; and
determining that the camera is not misaligned if the pixels corresponding to the non-changing region are not changing in the second set of sequential frames, the pixels corresponding to the changing region are changing in the second set of sequential frames, or both.

8. A vehicle comprising:
a body;
a camera mounted on the body, the camera configured to generate:
a first plurality of camera images, each of the first plurality of camera images including a plurality of pixels in a first set of sequential frames; and
subsequent to the first plurality of camera images, a second plurality of camera images for the camera, each of the second plurality of camera images including a second plurality of pixels in a second set of sequential frames that correspond with, and are subsequent to, the first set of sequential frames; and
a processor configured to at least facilitate:
analyzing the pixels of the first plurality of camera images of the first set of sequential frames with respect to color, brightness, or both;
defining a non-changing region of the in the first plurality of camera images in which the pixels are not changing between the first set of sequential frames, wherein the pixels are determined to not be changing if a rate of change of brightness of respective pixels between the first set of sequential frames does not exceed a first predetermined threshold, a rate of change of color of respective pixels between the first set of sequential frames does not exceed a second predetermined threshold, or both;
defining a changing region of the first plurality of camera images in which the pixels are changing between the first set of sequential frames, wherein the pixels are determined to be changing if the rate of change of brightness of respective pixels between the first set of sequential frames exceeds the first predetermined threshold, the rate of change of color of respective pixels between the first set of sequential frames exceeds the second predetermined threshold, or both;

analyzing the pixels of the second plurality of camera images of the second set of sequential frames with respect to color, brightness, or both;

determining whether pixels of the second plurality of camera images corresponding to the non-changing region of the first plurality of camera images are in fact changing in the second set of sequential frames, wherein the pixels of the second plurality of camera images are determined be changing in the second set of sequential frames if the rate of change of brightness of respective pixels between the second set of sequential frames exceeds the first predetermined threshold, the rate of change of color of respective pixels between the second set of sequential frames exceeds the second predetermined threshold, or both;

determining whether pixels of the second plurality of camera images corresponding to the changing region of the first plurality of camera images are in fact not changing in the second set of sequential frames, wherein the pixels of the second plurality of camera images are determined be not changing in the second set of sequential frames if the rate of change of brightness of respective pixels between the second set of sequential frames does not exceed the first predetermined threshold, the rate of change of color of respective pixels between the second set of sequential frames does not exceed the second predetermined threshold, or both; and determining whether the camera is misaligned in its mounting on the vehicle based on the analyzing of the color, the brightness, or both, of the pixels, including based on whether the pixels corresponding to the non-changing region of the first set of sequential frames are in fact changing in the second set of sequential frames, the pixels corresponding to the changing region of the first set of sequential frames are in fact not changing in the second set of sequential frames, or both.

9. The vehicle of claim 8, wherein the processor is configured to at least facilitate:
determining that the camera is misaligned if the pixels corresponding to the non-changing region are changing in the second set of sequential frames, the pixels corresponding to the changing region are not changing in the second set of sequential frames, or both; and
determining that the camera is not misaligned if the pixels corresponding to the non-changing region are not changing in the second set of sequential frames, the pixels corresponding to the changing region are changing in the second set of sequential frames, or both.

10. The vehicle of claim 8, wherein the processor is configured to at least facilitate:
further defining the non-changing region and the changing region using information pertaining to a fixed object on the vehicle that obstructs the non-changing region but does not obstruct the changing region of the camera images.

11. The vehicle of claim 8, further comprising:
a communication link configured to provide the first plurality of camera images and the second plurality of camera images from the camera to the processor.

12. The method of claim 1, wherein:
the pixels of the first plurality of camera images are determined to not be changing in the first set of sequential frames if the rate of change of brightness of respective pixels between the first set of sequential frames does not exceed the first predetermined threshold;
the pixels of the first plurality of camera images are determined to be changing in the first set of sequential frames if the rate of change of brightness of respective pixels between the first set of sequential frames exceeds the first predetermined threshold;
the pixels of the second plurality of camera images are determined be changing in the second set of sequential frames if the rate of change of brightness of respective pixels between the second set of sequential frames exceeds the first predetermined threshold; and
the pixels of the second plurality of camera images are determined be not changing in the second set of sequential frames if the rate of change of brightness of respective pixels between the second set of sequential frames does not exceed the first predetermined threshold.

13. The method of claim 1, wherein:
the pixels of the first plurality of camera images are determined to not be changing in the first set of sequential frames if the rate of change of color of respective pixels between the first set of sequential frames does not exceed the second predetermined threshold;
the pixels of the first plurality of camera images are determined to be changing in the first set of sequential frames if the rate of change of color of respective pixels between the first set of sequential frames exceeds the second predetermined threshold;
the pixels of the second plurality of camera images are determined be changing in the second set of sequential frames if the rate of change of color of respective pixels between the second set of sequential frames exceeds the second predetermined threshold; and
the pixels of the second plurality of camera images are determined be not changing in the second set of sequential frames if the rate of change of color of respective pixels between the second set of sequential frames does not exceed the second predetermined threshold.

14. The method of claim 1, wherein the determining of whether the camera is misaligned comprises determining that the camera is misaligned if the pixels corresponding to the non-changing region are changing in the second set of sequential frames.

15. The method of claim 1, wherein the determining of whether the camera is misaligned comprises determining that the camera is misaligned if the pixels corresponding to the changing region are not changing in the second set of sequential frames.

16. The system of claim 6, wherein:
the pixels of the first plurality of camera images are determined to not be changing in the first set of sequential frames if the rate of change of brightness of respective pixels between the first set of sequential frames does not exceed the first predetermined threshold;

the pixels of the first plurality of camera images are determined to be changing in the first set of sequential frames if the rate of change of brightness of respective pixels between the first set of sequential frames exceeds the first predetermined threshold;

the pixels of the second plurality of camera images are determined be changing in the second set of sequential frames if the rate of change of brightness of respective pixels between the second set of sequential frames exceeds the first predetermined threshold; and the pixels of the second plurality of camera images are determined be not changing in the second set of sequential frames if the rate of change of brightness of respective pixels between the second set of sequential frames does not exceed the first predetermined threshold.

17. The system of claim 6, wherein:

the pixels of the first plurality of camera images are determined to not be changing in the first set of sequential frames if the rate of change of color of respective pixels between the first set of sequential frames does not exceed the second predetermined threshold;

the pixels of the first plurality of camera images are determined to be changing in the first set of sequential frames if the rate of change of color of respective pixels between the first set of sequential frames exceeds the second predetermined threshold;

the pixels of the second plurality of camera images are determined be changing in the second set of sequential frames if the rate of change of color of respective pixels between the second set of sequential frames exceeds the second predetermined threshold; and the pixels of the second plurality of camera images are determined be not changing in the second set of sequential frames if the rate of change of color of respective pixels between the second set of sequential frames does not exceed the second predetermined threshold.

18. The vehicle of claim 8, wherein:

the pixels of the first plurality of camera images are determined to not be changing in the first set of sequential frames if the rate of change of brightness of respective pixels between the first set of sequential frames does not exceed the first predetermined threshold;

the pixels of the first plurality of camera images are determined to be changing in the first set of sequential frames if the rate of change of brightness of respective pixels between the first set of sequential frames exceeds the first predetermined threshold;

the pixels of the second plurality of camera images are determined be changing in the second set of sequential frames if the rate of change of brightness of respective pixels between the second set of sequential frames exceeds the first predetermined threshold; and the pixels of the second plurality of camera images are determined be not changing in the second set of sequential frames if the rate of change of brightness of respective pixels between the second set of sequential frames does not exceed the first predetermined threshold.

19. The vehicle of claim 8, wherein:

the pixels of the first plurality of camera images are determined to not be changing in the first set of sequential frames if the rate of change of color of respective pixels between the first set of sequential frames does not exceed the second predetermined threshold;

the pixels of the first plurality of camera images are determined to be changing in the first set of sequential frames if the rate of change of color of respective pixels between the first set of sequential frames exceeds the second predetermined threshold;

the pixels of the second plurality of camera images are determined be changing in the second set of sequential frames if the rate of change of color of respective pixels between the second set of sequential frames exceeds the second predetermined threshold; and the pixels of the second plurality of camera images are determined be not changing in the second set of sequential frames if the rate of change of color of respective pixels between the second set of sequential frames does not exceed the second predetermined threshold.

* * * * *